United States Patent
Takahashi et al.

[11] Patent Number: 5,521,495
[45] Date of Patent: May 28, 1996

[54] SENSOR FOR CONTACTLESS DETERMINATION OF AN ANGLE OF ROTATION OF A ROTATABLE STRUCTURAL ELEMENT

[75] Inventors: Hajime Takahashi; Wataru Nagasaki; Ken Togashi; Kazuhiko Shimoda, all of Higashi-Matsuyama, Japan

[73] Assignee: Zexel Corporation, Tokyo, Japan

[21] Appl. No.: 310,086

[22] Filed: Sep. 22, 1994

[30]  Foreign Application Priority Data

Sep. 24, 1993 [JP] Japan ................................ 5-261595
Dec. 24, 1993 [JP] Japan ................................ 5-347372

[51] Int. Cl.⁶ .......................... G01B 7/30; G01D 5/20; G01D 5/22
[52] U.S. Cl. .................... 324/207.18; 324/207.22; 324/207.25
[58] Field of Search .................... 324/207.15, 207.16, 324/207.17, 207.18, 207.19, 207.22, 207.25; 340/870.32, 870.33, 870.35

[56]  References Cited

FOREIGN PATENT DOCUMENTS

| | | |
|---|---|---|
| 0365758 | 5/1990 | European Pat. Off. . |
| 0077656 | 7/1978 | Japan ........................ 324/207.18 |
| 1012301 | 4/1983 | U.S.S.R. ................... 324/207.18 |
| 92/14121 | 8/1992 | WIPO . |

*Primary Examiner*—Gerard R. Strecker
*Attorney, Agent, or Firm*—Wenderoth, Lind & Ponack

[57]  ABSTRACT

A rotor 10 is constructed of a rotating shaft 7 and a semicylindrical rotating core 9 mounted on the shaft 7. A stator is coaxially arranged, with the rotor 10 being surrounded by a pair of annular stator coils 11 and 13 arranged one above the other in an axial direction of the rotor 10. A yoke member of the coils 11 and 13 is provided with magnetic material plates 19, 21, 23 and 25. The plates 19 and 21 for the coil 11 have halves 19A and 21A with inner peripheral portions protruding radially inwardly to approach the rotor 10, while the remaining plates 23 and 25 for the coil 13 have halves 23A and 25A with their inner peripheral portions protruding radially inwardly to approach the rotor 10. The halves 23A and 25A are oppositely disposed from the halves 19A and 21A so as to have the coils 11 and 13 be opposite to each other in phase of the inductance as the rotor 10 rotates.

16 Claims, 6 Drawing Sheets

FIG. 11
FIG. 12
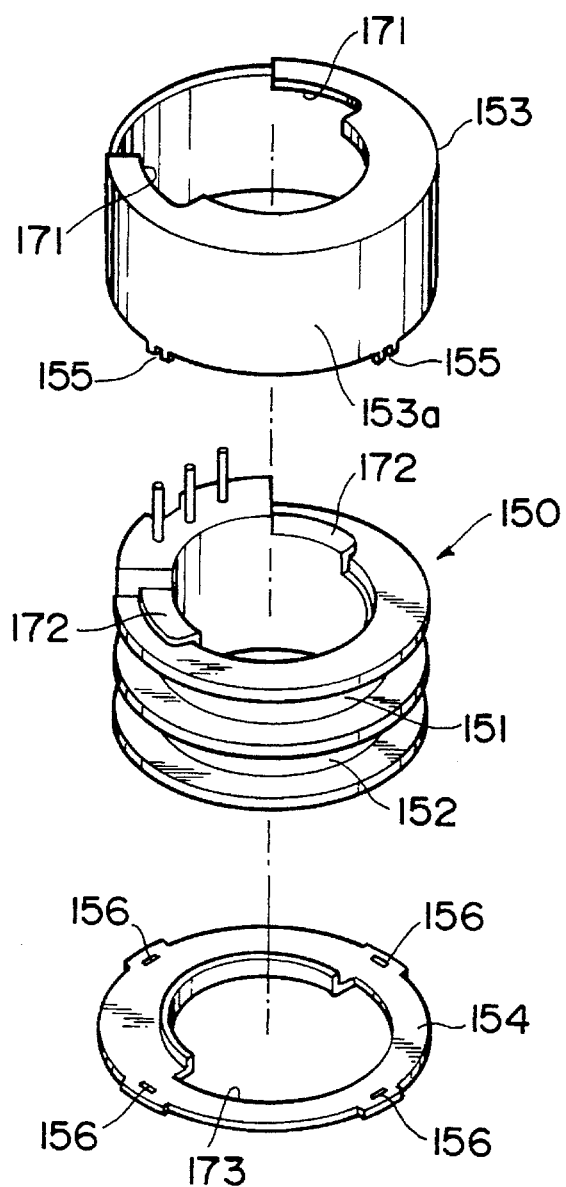
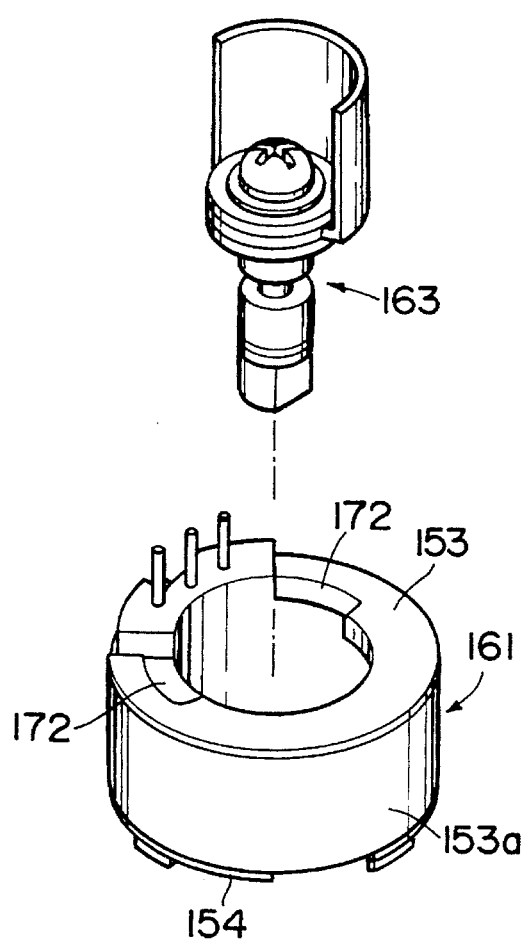

5,521,495

SENSOR FOR CONTACTLESS DETERMINATION OF AN ANGLE OF ROTATION OF A ROTATABLE STRUCTURAL ELEMENT

BACKGROUND OF THE INVENTION

1. Field of the Invention

The present invention relates to a sensor for contactless determination of an angle of rotation rotatable structural element.

2. Description of the Related Art

Sensors are classified into two basic types, i.e., contact-type ones and contactless-type ones. A typical one of the contact-type is constructed of a resistor element and a rotating brush kept in contact with the resistor element. The contact-type sensors are simple in construction and low in manufacturing cost. However, any of the contact-type sensors is at a disadvantage in being shortened in service life due to wear on the contact areas of its components. On the other hand, the contactless-type sensors are free from the above disadvantage. A typical one of the contactless-type sensors is constructed of: a stator provided with a pair of coils and, a rotor provided with at least one magnetic-substance portion which is so arranged to vary the distance between the magnetic-substance portion and each of the coils when the rotor rotates to vary its angle of rotation relative to the stator. In the typical one of the contact-less type sensors, the angle of rotation, i.e., angular displacement of the rotor, is determined through detection of variations in voltage in a circuit caused by variations inductance in the pair of the coils forming the circuit.

As for the contactless-type sensors, Japanese Patent Laid-Open No. Sho 59-174702 discloses a concrete example of the sensors, in which a stator is constructed of a cylindrical yoke member and a pair of coils oppositely disposed from each other in a diametrical direction on a line perpendicular to a central axis of the cylindrical yoke member. In the above example, a rotor of the sensor is constructed of a semicylindrical magnetic-substance element which is rotatable on the central axis of the cylindrical yoke member. In operation, the rotor assuming the semicylindrical shape is detected in angular displacement by the pair of coils, in which the angular displacement of the rotor is converted into variations in conductances of the coils, i.e., variations in voltage in a circuit comprising the coils, which permits the example of the sensor to determine the angular displacement of the rotor through detection of the variations in voltage.

This example, i.e., the conventional sensor for contactless determination of the angular displacement of the rotor, has the disadvantage that the stator is too complex in manufacturing. In other words, in the stator of the conventional sensor, the pair of coils are disposed on an inner peripheral surface of the cylindrical yoke member so as to be oppositely disposed from each other. In manufacturing such coils, first each of the coils is formed; and then the formed coils are disposed in predetermined positions on the inner peripheral surface of the yoke member through assembly operations. In this case, since the conventional sensor is directly influenced in its determination accuracy by variations in the installation positions of the coils. It is necessary for the conventional sensor to perform the positioning operations or assembly operations of the coils with a very high accuracy, which impairs the conventional sensor in productivity.

SUMMARY OF THE INVENTION

It is an object of the present invention to provide a sensor for the contactless determination of an angle of rotation of a rotatable structural element with high accuracy and in a stable manner, which sensor is free from the problems inherent in the conventional sensors, easy in manufacturing and capable of positioning its coils with high accuracy in assembly operations.

The above object of the present invention is accomplished by providing a sensor for contactless determination of an angle of rotation of a rotatable structural element that comprises a rotor provided with a magnetic-substance element arranged asymmetrically with respect to an axis of rotation of the rotor. A first and second annular stator coil are arranged coaxially with respect to the rotor. A magnetic-circuit member forms a yoke or core for each of the first and the second annular stator coil. The magnetic-circuit member for the first stator coil assumes an asymmetric shape with respect to the axis of rotation of the rotor so as to approach the magnetic-substance element of the rotor only when the angle of rotation of the rotor is in a first angular range, whereby the magnetic-substance element of the rotor functions as a part of a magnetic circuit of the first stator coil.

The magnetic-circuit member for the second stator coil assumes an asymmetric shape with respect to the axis of rotation of the rotor so as to approach the magnetic-substance element of the rotor only when the angle of rotation of the rotor is in a second angular range outside the first angular range, whereby the magnetic-substance element of the rotor functions as a part of a magnetic circuit of the second stator coil.

Consequently, in the present invention having the above construction, since the first angular range in which the magnetic-substance element of the rotor functions as a part of the magnetic circuit of the first stator coil is outside the second angular range in which the magnetic-substance element of the rotor functions as a part of the magnetic circuit of the second stator coil, the first and the second stator coils have the inductances vary in alternating phase patterns as the rotor rotates. This enables the sensor to detect the angle of rotation of the rotatable structural element based on the differences in induction between these stator coils.

Preferably, each of the stator coils assumes an annular shape coaxially arranged with respect to the axis of rotation of the rotor. In this case, it possible to manufacture each of the stator coils in an easy manner through a simple operation, for example, by winding a wire on an annular bobbin. In addition, assembly operations of the stator coils in the sensor are simply accomplished by coaxially arranging the stator coils with respect to the rotor. Consequently, it is possible to perform positioning operations of the stator coils with high accuracy in a simple manner through the assembly operations, for example, by inserting the bobbins wound with the stator coils into a cylindrical casing of the sensor after insertion of the rotor into the casing.

Further, in the present invention having the above construction, the detecting accuracy of the sensor is directly influenced by asymmetrical shapes of the stator coils and positions of the stator coils relative to each other. As for the magnetic-circuit forming members, it is possible to manufacture them with a high accuracy in shape from magnetic-substance plates through press workings or through sintering processes of ferrous-metal powders. In assembly operations of the magnetic-circuit forming members, there are employed a plurality of positioning means which enable all the magnetic-circuit forming members or plates, bobbins and the rotor to be properly positioned relative to each other in the casing of the sensor by simply inserting them in this order into the casing. As is clear from the above, according to the present invention, it is possible to easily manufacture the sensor to have high accuracy in the contactless determination of the angle of rotation of the rotatable structural element.

BRIEF DESCRIPTION OF THE DRAWINGS

FIG. 11 is an exploded perspective view of another embodiment of the sensor of the present invention, illustrating a positioning means provided in the sensor of the present invention; and FIG. 12 is an exploded perspective view of the embodiment of the present invention shown in FIG. 11, illustrating assembly operations thereof.

DESCRIPTION OF THE PREFERRED EMBODIMENTS

Hereinbelow, the present invention will be described in detail with reference to the accompanying drawings.

Figure 1:
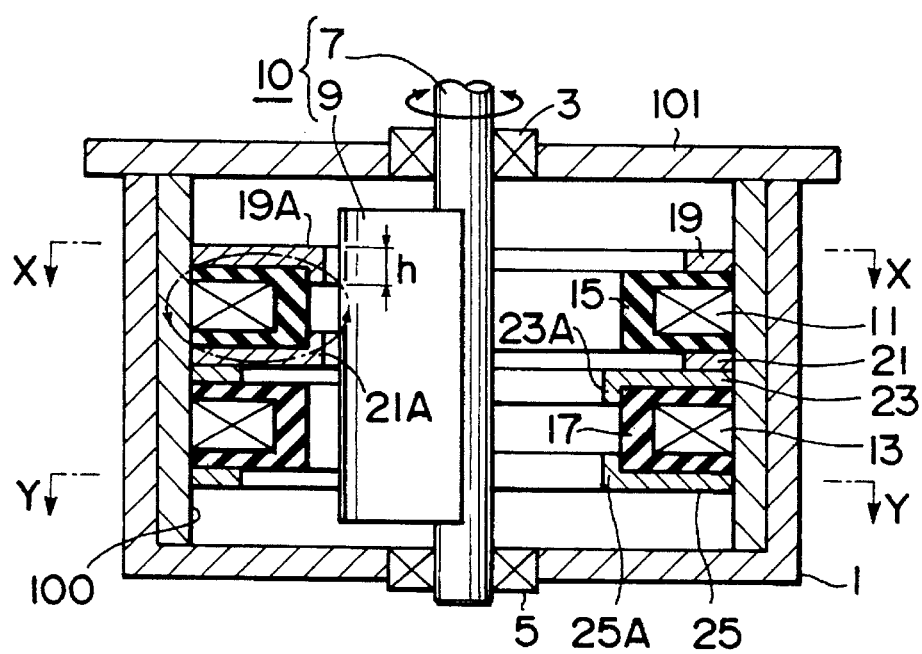
FIG. 1 is a longitudinal sectional view of an essential part of a sensor of an embodiment of the present invention.
Figure 2A:
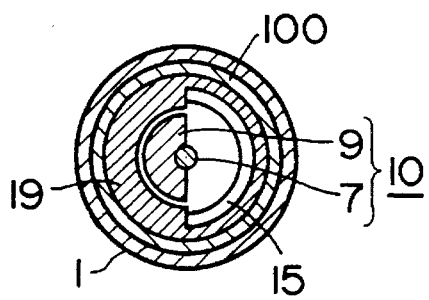
FIG. 2A is cross-sectional view of the sensor of the present invention, taken along line X—X of FIG. 1.
Figure 2B:
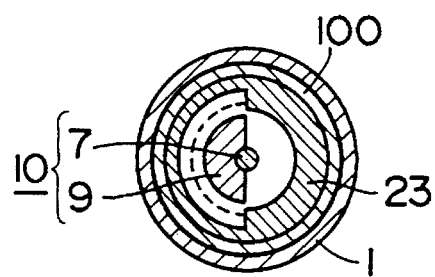
FIG. 2B is a cross-sectional view of the sensor of the present invention taken along line Y—Y of FIG. 1.
Figure 3:
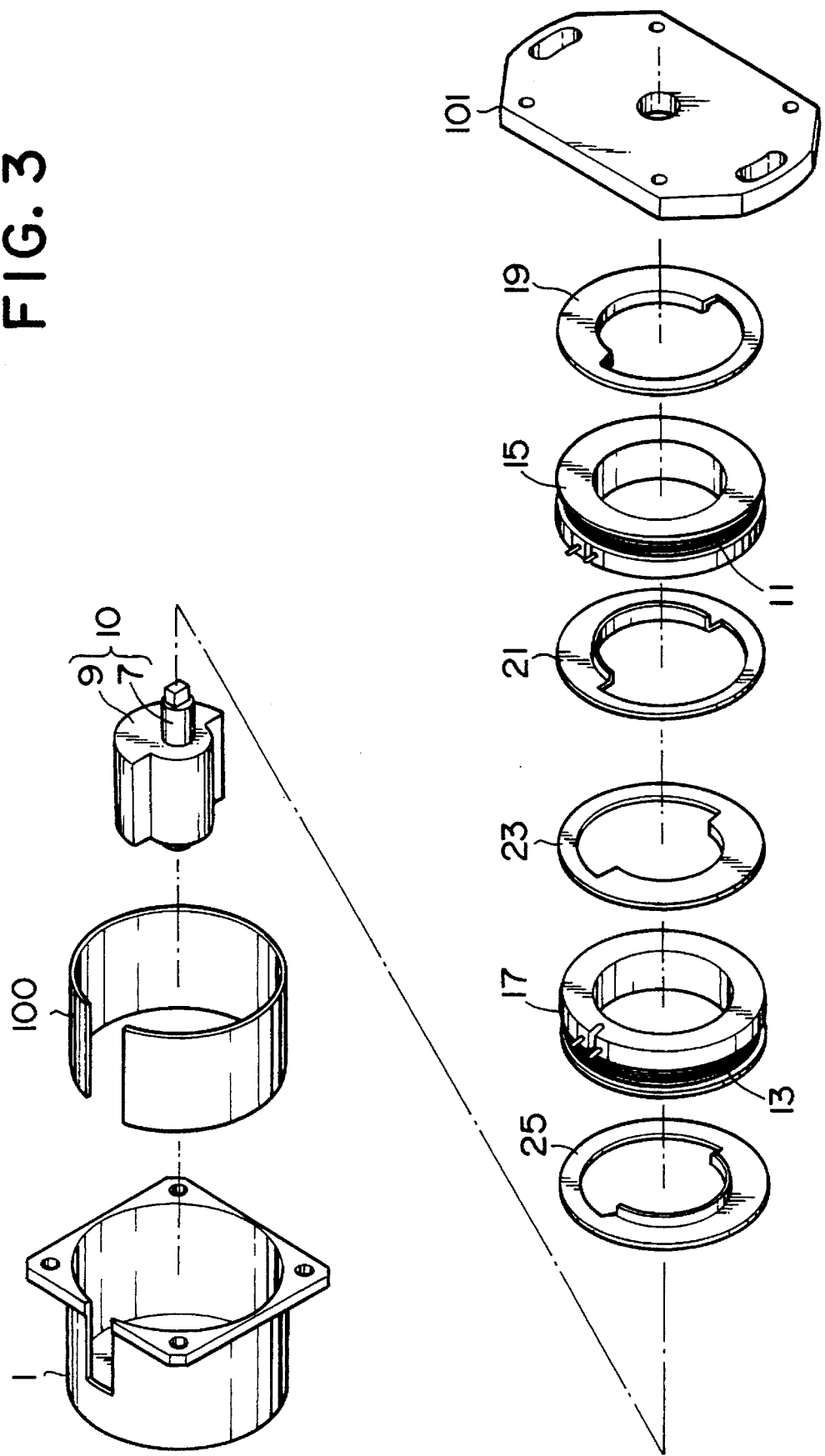
FIG. 3 is an exploded perspective view of the sensor of the present invention shown in FIG. 1.

In a first embodiment of the present invention shown in FIGS. 1 to 3, a sensor for contactless determination of an angle of rotation of a rotatable structural element according to the present invention is provided with a casing 1, which has a hollow cylindrical shape having at least its outer peripheral wall portion made of a magnetic substance. As is clear from FIG. 1, a yoke segment 100 made of a magnetic substance is fitted in the casing 1. Coaxially mounted in the casing 1 through a pair of bearings 3 and 5 is a rotating shaft 7 which is made of a non-magnetic substance and is rotatable relative to the casing 1. Fixedly mounted on a portion of the rotating shaft 7 inside the casing 1 is a rotating core member 9. The core member 9 is made of a magnetic substance and has a semicylindrical shape extending axially and parallel with the rotating shaft 7, so as to have its center axis coincide in position with that of the rotating shaft 7.

A rotor 10 of the sensor of the present invention is constructed of the rotating shaft 7 and the rotating core member 9. Incidentally, the rotating core member 9 functions as a core member of each of a first stator coil 11 and a second stator coil 13.

The stator coils 11 and 13, each of which has an annular shape, are fitted in the casing 1 so as to surround the rotor 10. The stator coils 11 and 13 are wound on annular bobbins 15 and 17, respectively. The bobbins 15 and 17 are fitted in the yoke segment 100 fitted in the casing 1. In other words, the bobbins 15 and 17 have their outer peripheral surfaces abut the inner peripheral surface of the yoke segment 100 fitted in the casing 1, and therefore are coaxially arranged with respect to the axis of rotation of the rotor 10 so as to overlap each other in a direction parallel to the axis of rotation of the rotor 10.

Fixedly mounted on opposite axial sides or surfaces (i.e., an upper and a lower surface, as viewed in FIG. 1) of the bobbin 15 of the first stator coil 11 are a pair of magnetic-substance plates 19 and 21 each of which assumes a partially-flanged annular shape. These magnetic-substance plates 19 and 21 have their outer peripheral surfaces abut the inner peripheral surface of the yoke segment 100 fitted in the casing 1. A yoke member for the first stator coil 11 is constructed of the pair of the magnetic-substance plates 19 and 21 and the yoke segment 100.

In the same manner as described above, a pair of magnetic-substance plates 23 and 25 each of which has a partially-flanged annular shape, are fixedly mounted on opposite axial sides or surfaces (i.e., an upper and a lower surface as viewed in FIG. 1) of the bobbin 17 of the second stator coil 13. These magnetic-substance plates 23 and 25 have their outer peripheral surfaces abut the inner peripheral surface of the yoke segment 100 fitted in the casing 1. A yoke member for the second stator coil 13 is constructed of the pair of the magnetic-substance plates 23 and 25 and the yoke segment 100.

Incidentally, an open end (i.e., an upper end, as viewed in FIG. 1) of the casing 1 is closed with a flanged disc-like member 101.

As is clear from FIG. 2A, an inner peripheral portion of each of the magnetic-substance plates 19 and 21 forming a part of the yoke member of the first stator coil 11 is half constructed of a radially inwardly protruding portion and half of a radially outwardly recessed portion. Namely, the radially inwardly protruding portion of the magnetic-substance plate 19 is denoted by the reference numeral 19A, and that of the magnetic-substance plate 21 is denoted by the reference numeral 21A, as shown in FIG. 1. Each of the protruding portions 19A, 21A has an angular range (i.e., a central angle) of 180° with respect to the axis of rotation of the rotor 10, and has its inner-end portion flanged to extend axially parallel to the axis of rotation of the rotor 10. Namely, as is clear from FIG. 1, the thus flanged inner-end portion of each of the protruding portions 19A, 21A extends radially inwardly from an inner peripheral surface of the annular bobbin 15, and then axially extends parallel to the same so as to be adjacent to the inner peripheral surface of the annular bobbin 15. As is clear from the above description and from FIG. 2A, the remaining inner peripheral portion, i.e. each of the radially outwardly recessed portions of the magnetic-substance plates 19 and 21, has a central angle of 180°, has its inner-end portion not flanged so as to be smaller in the area of its inner peripheral surface than the flanged inner-end portion of each of the radially inwardly protruding portions 19A and 21A, and has its inner-end portion disposed so as to permit the rotor 10 to be closer to the inner peripheral surface of the bobbin 15 than to the inner-end portion.

In a condition in which the rotor 10 rotates so as to have its rotating core member 9 reach the position shown in FIGS. 1 and 2A so as to face the protruding portions 19A and 21A of the magnetic-substance plates 19 and 21, an outer peripheral surface of the rotating core member 9 faces each of the inner peripheral surfaces of the protruding portions 19A and 21A through a minute clearance. As a result, a magnetic circuit as shown in alternate long and short dash lines in FIG. 1 is formed around the first stator core 11 to permit the rotating core member 9 to function as a core element of the first stator coil 11. The same is true as to the second stator coil 13, as described later.

On the other hand, in condition in which the rotor 10 rotates to have its rotating core member 9 reach the other side position shown in FIG. 2B, the rotating core member 9 is spaced far away from the protruding portions 19A and 21A of the magnetic-substance plates 19 and 21. Consequently, a magnetic circuit is not formed as to the rotating core member 9, and therefore the core member 9 does not function as core element of the first stator coil 11. The same is true as to the second stator coil 13 as described later.

Namely, as the rotor 10 rotates, the rotating core member 9 has its outer peripheral surface move alternately toward and away from the inner peripheral surfaces of the protruding portions 19A and 21A of the magnetic-substance plates 19 and 21 so as to intermittently serve as the core element of the first stator coil 11, which causes the inductance of the stator coil 11 to vary.

Incidentally, in order to obtain large variations of the inductance, it is necessary to increase in area the inner peripheral surfaces of the protruding portions 19A and 21A of the magnetic-substance plates 19 and 21 and to increase the axial clearance between the protruding portions 19A and 21A. In order to increase the inner peripheral surfaces of the protruding portions 19A and 21A in area it is necessary to increase the height h (i.e. axial length h) of each of the flanged inner-end portions of the protruding portions 19A and 21A. On the other hand, in order to increase the axial clearance between the protruding portions 19A and 21A, it is necessary to decrease the height or axial length h. Based on the above facts, it has been found that a preferable value of the height h is approximately a quarter of an axial thickness (i.e., a vertical length, as viewed in FIG. 1) of the first stator coil 11.

On the other hand, as for the remaining magnetic-substance plates 23 and 25 forming a part of a yoke member of the second stator coil 13, an inner peripheral portion of each of the magnetic-substance plates 23 and 25 is half constructed of a radially inwardly protruding portion and half of a radially outwardly recessed portion. Namely, the radially inwardly protruding portion of the magnetic-substance plate 23 is denoted by the reference numeral 23A, and that of the magnetic-substance plate 25 is denoted by the reference numeral 25A, as shown in FIG. 1. Each of the protruding portion 23A and 25A has an angular range (i.e., a central angle) of 180° with respect to the axis of rotation of the rotor 10, and has its inner-end portion flanged so as to extend axially and parallel to the axis of rotation of the rotor 10. Namely, as is clear from FIG. 1, the thus flanged inner-end portion of each of the protruding portions 23A and 25A radially inwardly extends from an inner peripheral surface of the annular bobbin 17, and then axially extends parallel to the same so as to be adjacent to the inner peripheral surface of the annular bobbin 17. As is clear from the above description and from FIGS. 1 and 2B, the remaining inner peripheral portion. i.e., each of the radially outwardly recessed portions of the magnetic-substance plates 23 and 25 has an angular range (i.e., a central angle) of 180° has its inner-end portion not flanged so as to be smaller in area at its inner peripheral surface than the flanged inner-end portion of each of the radially inwardly protruding portions 23A and 25A and, has its inner-end portion disposed so as to permit the rotor 10 to be closer to the inner peripheral surface of the bobbin 17 than to the inner-end portion. Incidentally, a semicircular shape shown in dotted line in FIG. 2B is of the inner peripheral surface of the annular bobbin 17, illustrating the position of the inner peripheral surface.

As is clear from FIGS. 2A and 2B, the protruding portions 19A and 21A of the magnetic-substance plates 19 and 21 and those 23A and 25A of the magnetic-substance plate 23 and 25 do not overlap each other. In other words, the former, 19A and 21A, and the latter, 23A and 25A are 180 degrees out-of-phase in arrangement relative to each other.

Consequently, as the rotor 10 rotates, the stator coils 11 and 13 vary in inductance so as to have their induced voltages be 180 degrees out-of-phase relative to each other.

Figure 4:
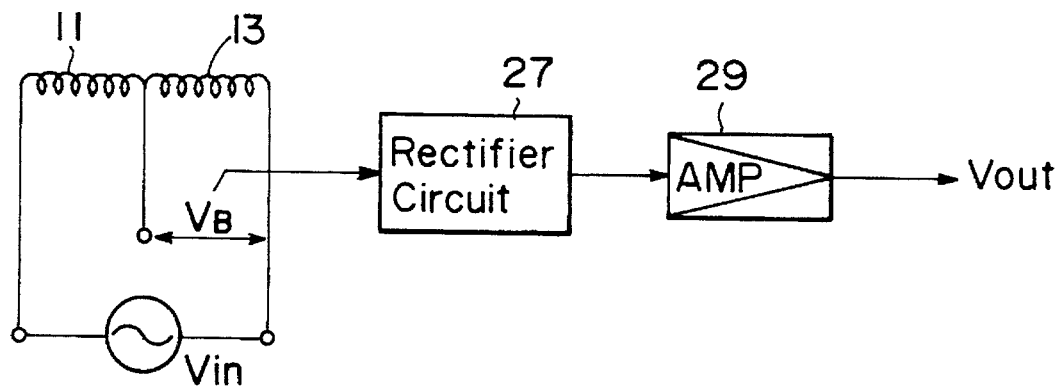
FIG. 4 is a diagram of an electrical circuit for the sensor of the present invention shown in FIG. 1.

FIG. 4 shows a diagram of an electric circuit used in the sensor of the embodiment of the present invention. The circuit comprises a rectifier circuit 27 for rectifying a tap voltage $V_B$ of the stator coil 11 (or 13), and an amplifier circuit 29 for amplifying an output voltage issued from the rectifier circuit 27.

The stator coils 11 and 13 are connected in series with each other. Applied across the coils 11 and 13 is an a.c. voltage Vin.

On the other hand, the tap voltage VB of the stator coil 11 (or 13) varies as the rotor 10 rotates. The tap voltage $V_B$ is rectified through the rectifier circuit 27 and amplified through the amplifier circuit 29, from which output detected voltage Vout is issued.

Figure 6:
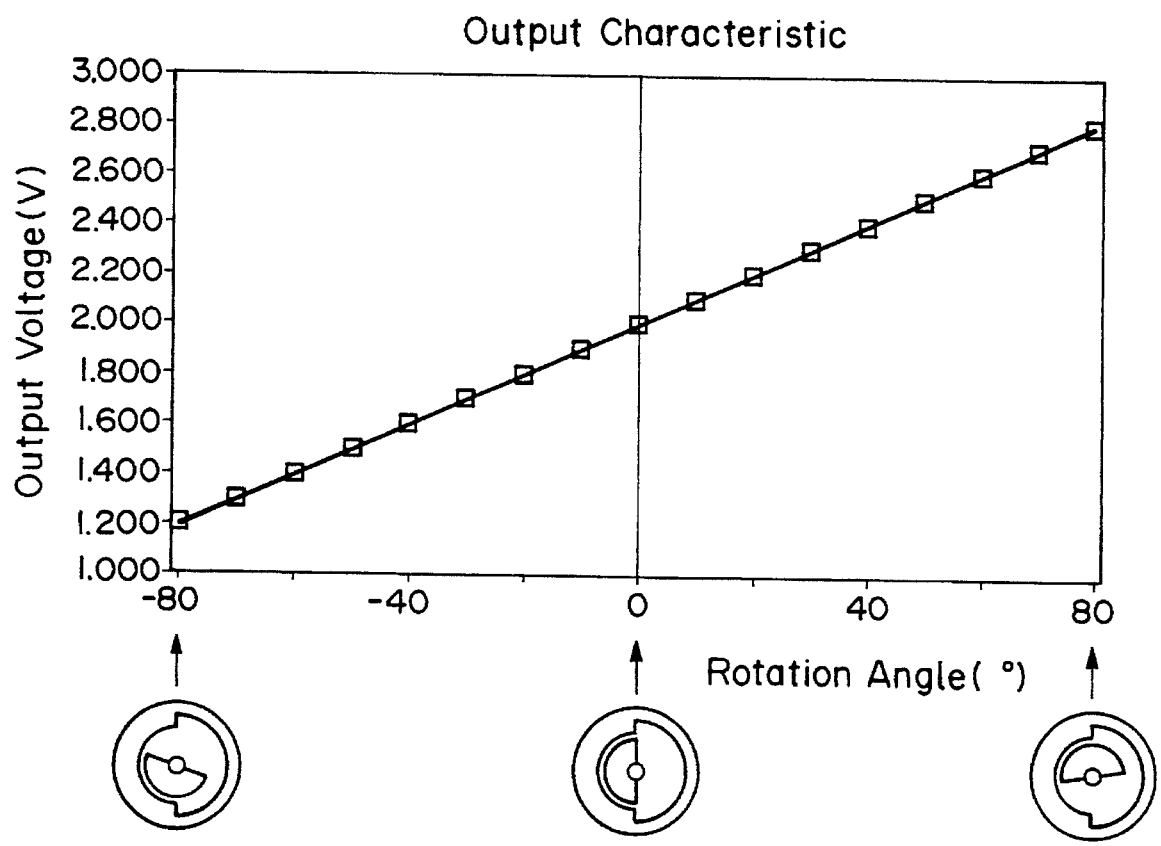
FIG. 6 is a graph illustrating the relationship between the output voltage and the angle of rotation in an angular range in which the output voltage appears to be linear.

As shown FIG. 6, the sensor of the embodiment of the present invention is substantially linear in output characteristic within a predetermined range of the angle of rotation of the rotor 10, i.e., the output voltage of the sensor is represented by a substantially linear function of the angle of rotation of the rotor 10 in the predetermined range of the angle of rotation.

The output characteristics, i.e., the output voltage Vout (shown in FIG. 4) issued from output terminals of the amplifier circuit 29 of the sensor of the present invention is obtained by applying the a.c. voltage Vin to the circuit of the sensor. The a.c. voltage Vin is a sine wave (oscillation frequency: 3.7 KHz) with an amplitude of 1 Vp-p, a null level of which is 2 V.

Figure 5:
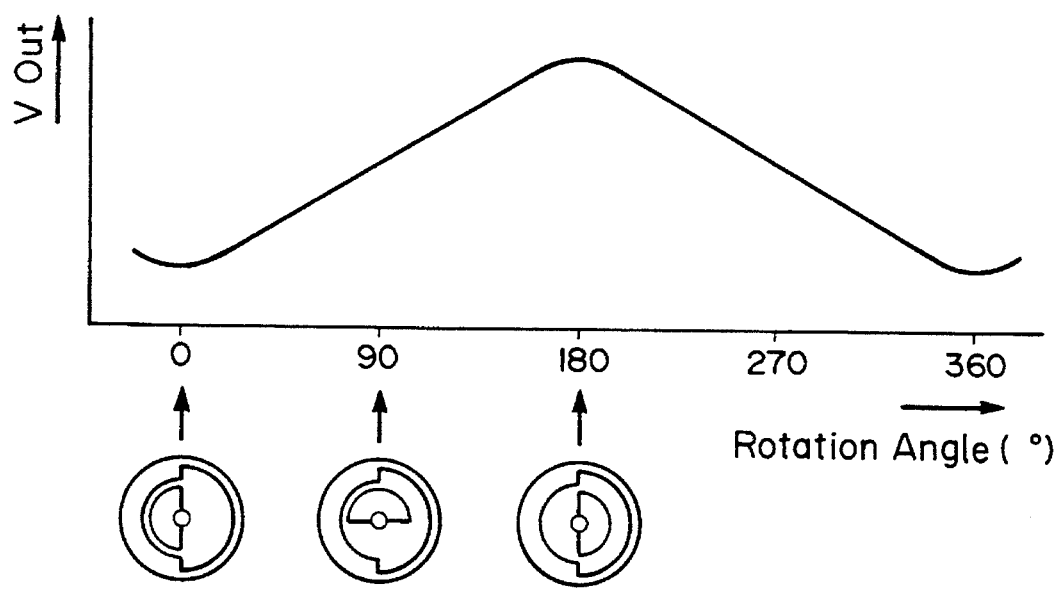
FIG. 5 is a graph illustrating the relationship between the variation of output voltage and the angle of rotation measured in the circuit shown in FIG. 4.

Variations of the a.c. voltage Vout during a full revolution of the rotor 10 relative to the stator coils 11 and 13 are shown in the graph of FIG. 5. As is clear from the output characteristics shown in FIG. 5, the value of the a.c. voltage Vout increases in an angular range of from 0° to 180°, and decreases in the remaining angular range of from 180° to 360°.

In practice, useful ones of the angular range of the graph shown in FIG. 5 are preferably: one around an angle of 90° (for example, one of from 10° to 170°, in which the graph is substantially linear); or one around an angle of 270° (for example, one of from 190° to 350°, in which the graph is substantially linear).

Figure 7:
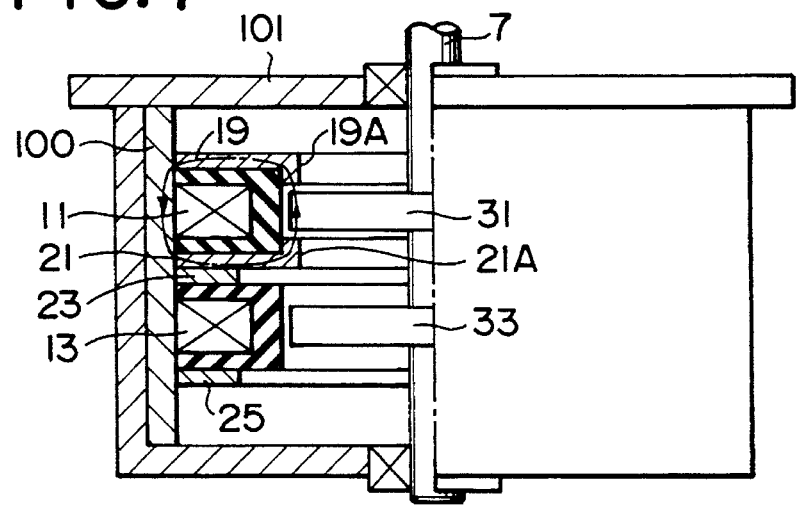
FIG. 7 is a longitudinal sectional view of an essential part of a second embodiment of the sensor of the present invention, illustrating a stator portion of the sensor.

FIG. 7 shows a second embodiment of the present invention which will be now described with reference to the drawings.

The construction of the second embodiment of the present invention is the same as that of the first embodiment of the present invention described above, with the exception of the construction of the rotor 10. Namely, in the rotor of the second embodiment of the present invention, two parallel-extending core members, i.e., a first core member 31 and a second core member 33, each of which is constructed of a semicircular magnetic-substance plate, are fixedly mounted on the rotating shaft 7 so as to be perpendicular to the shaft 7. Each of the core members 31 and 33 has its center axis coincide in position with the axis of rotation of the rotating shaft 7, and overlap each other in a direction parallel to the axis of rotation of the rotating shaft 7.

As shown in FIG. 7, in a condition in which the first core member 31 reaches a position in which an outer peripheral portion of the core member 31 is oppositely disposed from each of the protruding portions 19A and 21A of the magnetic-substance plates 19 and 21 (which form a part of the yoke member of the first stator coil 11) through a minute clearance in a direction parallel to the axis of rotation of the rotating shaft 7, the outer peripheral portion of the core member 31 is axially sandwiched between the protruding portions 19A and 21A through the minute clearances. This enables the first core member 31 to serve or function as a core element of the first stator coil 11. Namely, as shown in an alternate long and short dash line in FIG. 7, a magnetic circuit passing through the magnetic-substance plates 19 and 21, yoke segment 100 and the first core member 31 is formed around the first stator coil 11.

On the other hand, as for the second core member 33, in a condition in which the second core member 33 reaches a position in which an outer peripheral portion of the core member 33 is oppositely disposed from each of the protruding portions 23A and 25A (shown in FIG. 1) of the magnetic-substance plates 23 and 25 of the second stator coil 13 through a minute clearance in a direction parallel to the axis of rotation of the rotating shaft 7, the outer peripheral portion of the core member 33 is axially sandwiched between the protruding portions 23A and 25A through the minute clearances. This enables the second core member 33 to serve or function as a core element of the second stator coil 13. Namely, as in the case of the magnetic circuit around the first stator coil 11 shown by the alternate long and short dash line in FIG. 7, another magnetic circuit passing through the magnetic-substance plates 23 and 25, yoke segment 100 and the second core member 33 is formed around the second stator coil 13. Consequently, as the rotor 10 rotates, the stator coils 11 and 13 vary in inductance so as to have the induced voltages be 180 degrees out-of-phase relative to each other, because the protruding portions 19A and 21A of the magnetic-substance plates 19 and 21 (i.e., the former plates) and plates 23A and 25A of the magnetic-substance plates 23 and 25 (i.e., the latter plates) do not overlap each other so as to permit the former to be 180 degrees out-of-phase in arrangement relative to the latter.

Now, a third embodiment of the present invention will be described with reference to FIG. 8.

In the third embodiment of the present invention, a rotating shaft 47 made of a non-magnetic substance is rotatably mounted in a casing 41 through bearings 43 and 45 so as to be coaxially arranged with the casing 41. Fixedly mounted on an intermediate portion of the rotating shaft 47 in the casing 41 is a rotating yoke 49, which is made of a magnetic substance and has a semicircular plate form. The rotating yoke 49 has a center axis that coincides in position with an axis of rotation of the rotating shaft 47, so that a rotor 50 is constructed of the rotating yoke 49 and the rotating shaft 47. Incidentally, the rotating yoke 49 functions as a yoke member of each of stator coils 51 and 53, which will be described later.

These two stator coils 51 and 53, each of which has an annular shape, are fixedly mounted in the casing 41 so as to sandwich the rotating yoke 49 therebetween through minute clearances in a direction parallel to the axis of rotation of the rotating shaft 47 or of rotor 50. The stator coils 51 and 53 are wound on annular bobbins 55 and 57, respectively. The bobbins 55 and 57 have their outer peripheral surfaces fitted to the inner peripheral surface of a yoke segment 200 fitted in the casing 41. The thus fitted bobbins 55 and 57 have their center axes coincide in position with the axis of rotation of the rotor 50, and overlap each other in a direction parallel to the axis of rotation of the rotor 50 within the casing 41.

Figure 8:
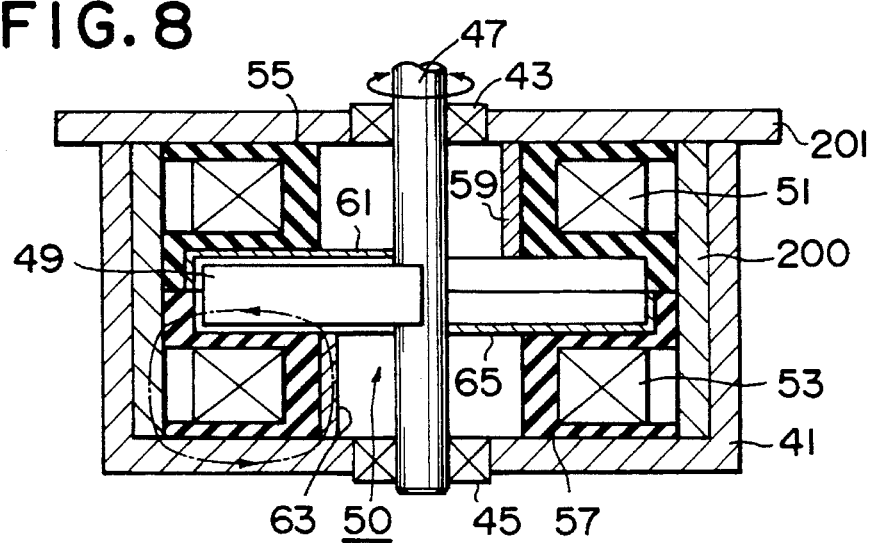
FIG. 8 is a longitudinal sectional view of an essential part of a third embodiment of the sensor of the present invention, illustrating a stator portion of the sensor.
Figure 9:
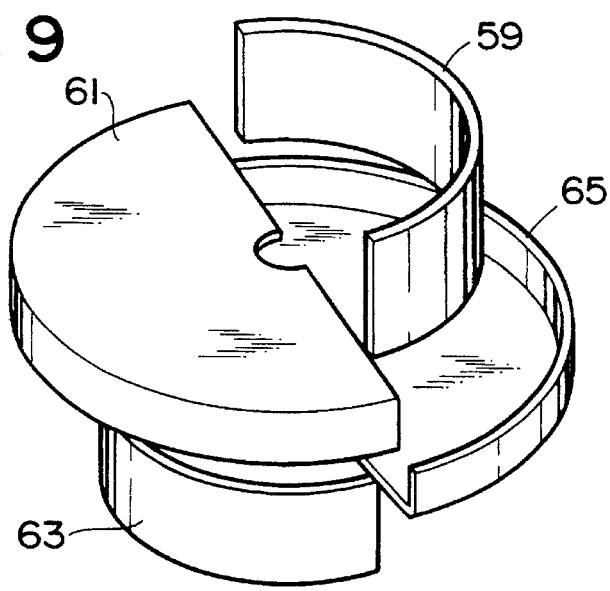
FIG. 9 is a perspective view of an essential part of the third embodiment of the sensor of the present invention, illustrating magnetic-substance plates or cores and electrically conductive plates for performing a magnetic shielding of the stator coils in the third embodiment.

As shown in FIG. 9, a semicylindrical core member 59 is fitted to the inner peripheral surface of the annular bobbin 55 of the stator coil 51. In construction an upper surface of the core member 59 (as viewed in FIG. 8) is brought into contact with a lower surface of a mounting flange member 201. On the other hand, the other side, i.e., a lower surface of the core member 59, faces the rotating yoke 49 through a minute clearance when the rotating yoke 49 reaches a position in which the rotating yoke 49 is oppositely disposed from the core member 59. As described later, when the rotating yoke 49 reaches a position in the vicinity of the semicylindrical core member 59, a yoke element for the stator coil 51 is constructed of the rotating yoke 49, core member 59, yoke segment 200 and the casing 41.

On the other hand, a conductive plate 61 is made of electrically conductive materials, for example such as copper and the like, and assumes a semicircular dish shape as shown in FIG. 9. The conductive plate 61 is fixedly mounted on a half area of a lower surface (as viewed in FIG. 8) of the annular bobbin 55, which half area is free from the core member 59, as is clear from FIG. 9. In action, the conductive plate 61 prevents the magnetic flux of the stator coil 51 from entering a lower half of the interior of the casing 41, in which lower half is contained the other stator coil 53.

As for the stator coil 53, what is described above for the stator coil 51 is true in construction and action for the stator coil 53. Namely a semicylindrical core member 63 is fitted to the inner peripheral surface of the annular bobbin 57 of the stator coil 53. In construction, a lower surface of the core member 63 (as viewed in FIG. 8) is brought into area contact with a bottom inner surface of the casing 41. On the other hand, the other side, i.e., an upper surface of the core member 63, faces the rotating yoke 49 through a minute clearance when the rotating yoke 49 reaches a position in which the rotating yoke 49 is oppositely disposed from the core member 63. As described later, when the rotating yoke 49 reaches a position in the vicinity of the semicylindrical core member 63, a yoke element for the stator coil 53 is constructed of the rotating yoke 49, core member 63, yoke segment 200 and the casing 41.

On the other hand, an electrically conductive plate 65, which assumes a semicircular dish shape as shown in FIG. 9, is fixedly mounted on a half area of an upper surface (as viewed in FIG. 8) of the annular bobbin 57, which half area is free from the core member 63, as is clear from FIG. 9. In action, the conductive plate 65 prevents the magnetic flux of the stator coil 53 from entering an upper half of the interior of the casing 41, in which upper half is contained the stator coil 51.

In the third embodiment of the present invention having the above construction, when the rotor 50 rotates to reach a position in which the rotating yoke 49 of the rotor 50 is placed close to the core member 63 of the stator coil 53, as is shown in an alternating long and short line in FIG. 8, a magnetic circuit passing through the rotating yoke 49, annular bobbin 57, yoke segment 200, casing 41 and the core member 63 is formed around the stator coil 53, so that the rotating yoke 49 functions as a yoke element for the stator coil 53. At this time, the magnetic flux of the stator coil 51 is prevented from entering the lower half of the interior of the casing 41 by means of the conductive plate 61. Consequently, there is no fear that the magnetic flux of the stator coil 51 passes through the rotating yoke 49. The same is true as to the magnetic flux of the stator coil 53 when the rotating yoke 49 reaches the other side position in which the rotating yoke 49 now functions as a yoke element of the stator coil 51, so that the magnetic flux of the stator coil 53 is now prevented from entering the upper half of the interior of the casing 41 by means of the conductive plate 65, in which upper half is contained the stator coil 51. Consequently, there is no fear that the magnetic flux of the stator coil 53 passes through the rotating yoke 49 now functioning as the core element of the stator coil 51.

When the rotor 50 rotates, the rotating yoke 49 alternately functions as the yoke element of the stator coil 51 and that of the stator coil 53. Consequently, the stator coils 51 and 53 are 180° out-of-phase in inductance relative to each other. As a result, it is possible to detect an angle of rotation of the rotor 50 by the use of an electrical circuit similar to that of FIG. 4.

Incidentally, in the first embodiment of the present invention described above with reference to FIGS. 1 to 6, the rotating core 9 member may assume hollow shape, provided that the core member 9 is asymmetrically arranged with the axis of rotation of the rotor 10. Further, although a range of the magnetic circuit constructed of the yoke member of the first embodiment is approximately 180°, it is also possible to properly decrease in width each of the protruding portions 19A, 21A, 23A and 25A of the yoke members or magnetic-substance plates 19, 21, 23 and 25 when an effective detection range of the first embodiment of the sensor of the present invention is less than 180°.

Now, a positioning means provided between the components of the sensor of the present invention will be described.

Figure 10:
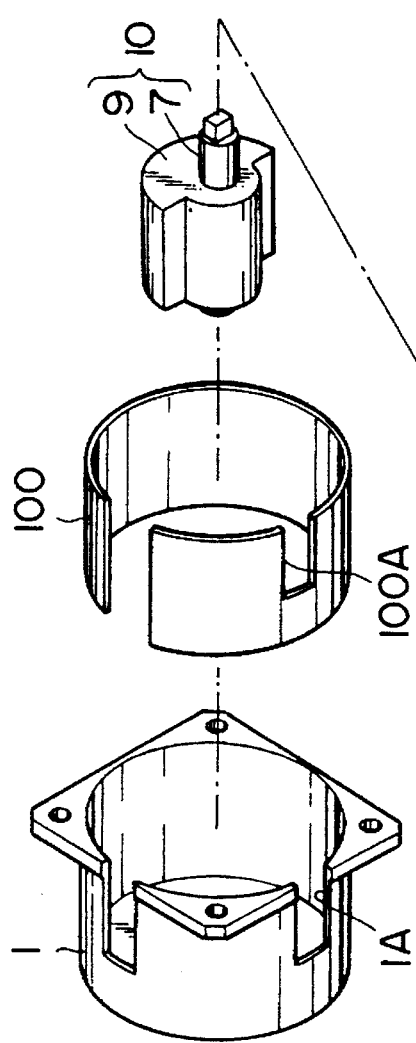
FIG. 10 is an exploded perspective view of another embodiment of a sensor of the present invention, illustrating the positioning means provided in the sensor of the present invention.
Figure 10:
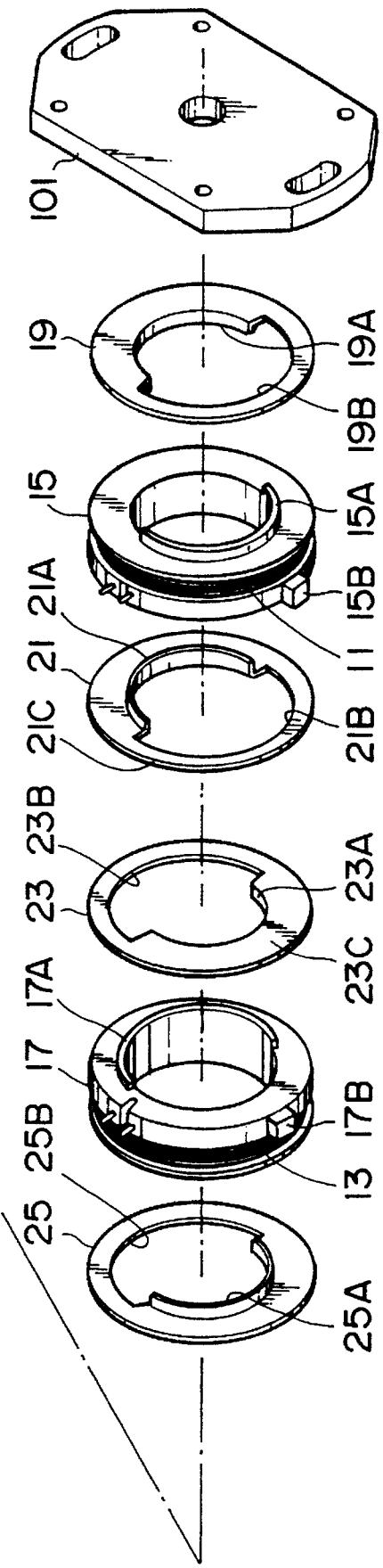

FIG. 10 shows a fourth embodiment of the sensor of the present invention, which substantially corresponds in construction to the first embodiment of the present invention shown in FIG. 3, with the exception of the provision of the positioning means. The fourth embodiment of the present invention will be described with reference to FIG. 10.

As described below in detail, the positioning means are provided between the magnetic-substance plates 19, 21, 23 and 25 and the annular bobbins 15 and 17; the annular bobbins 15 and 17; and, the annular bobbins 15 and 17 and the casing 1.

Namely, first, as already described above, the protruding portions 19A and 21A and 23A and 25A (i.e., halves) of the magnetic-substance plates 19 and 21 and 23 and 25 are fitted to the inner peripheral surfaces of the annular bobbins 15 and 17, respectively. Consequently, each pair of the protruding portions 19A and 21A, and 23A and 25A, functions as part of the yoke member of each of the stator coils 11 and 13, and further functions as the positioning means for positioning each of the annular bobbins 15 and 17.

The remaining halves of the magnetic-substance plates 19 and 21 and 23 and 25 are not provided with any protruding portion, and are largely notched or recessed to form recessed portions 19B and 21B and 23B and 25B. On the other hand, the annular bobbins 15 and 17 are provided with semicircular protruding portions 15A and 17A in their axial surfaces, respectively. The protruding portions 15A and 17A are fitted in the recessed portions 19B and 21B and 23B and 25B, respectively, so that the magnetic-substance plates 19 and 21 and 23 and 25 are positioned relative to the annular bobbins 15 and 17 through the positioning means constructed of the protruding portions 15A and 17A of the annular bobbins 15 and 17 and the recessed portions 19B, 21B, 23B and 25B.

Incidentally, in place of the semicircular protruding portions 15A and 17A, it is also possible to form grooves in positions corresponding to those of the protruding portions 15A and 17A in the bobbins 15, 17, and to form protruding portions in the magnetic-substance plates 19 and 21 and 23 and 25, so as to fit in the grooves, whereby a positioning means may be provided.

Of the magnetic-substance plates 19 and 21 and 23 and 25, the central ones 21 and 23 adjacent to each other are disposed in a back-to-back relationship so as to have their flat-side or back surfaces 21C and 23C abut against each other and welded to each other. In this case, it is possible to position the annular bobbins 15 and 17 relative to each other at the same time when the magnetic-substance plates 19, 21, 23 and 25 are positioned relative to the annular bobbins 15 and 17. Consequently, the magnetic-substance plates 21 and 23 having their back surfaces 21C and 23C welded to each other may function as the positioning means.

It is also possible to use the magnetic-substance plates 21 and while 23 having their back surfaces 21C and 23C not welded to each other as shown in FIG. 10. In this case, the annular bobbins 15 and 17 are provided with outer-peripheral projections 15B and 17B, respectively. In assembly operations, these projections 15B and 17B are fitted in a notched portion 1A of the casing 1 to form the positioning means.

Incidentally, in this case, it is natural to form a notched portion 100A in the yoke segment 100, which notched portion 100A corresponds in position to the notched portion 1A of the casing 1 so as to receive the projections 15A and 17A therein in the assembly operations.

As is clear from the above description, after the magnetic-substance plates 19 and 21 and 23 and 25, are positioned relative to the annular bobbins 15 and 17, respectively, it is possible to position the annular bobbins 15 and 17 relative to the casing 1 at the same time as when the bobbins 15 and 17 are positioned relative to each other, because the projections 15B and 17B are fitted in the notched portions 1A of the casing 1 by simply inserting the annular bobbins 15 and 17 into the casing 1, which bobbins 15 and 17 have been provided with the magnetic-substance plates 19 and 21, and 23 and 25, respectively.

Namely, in the embodiment of the present invention as shown in FIG. 10, since various types of positioning means may be provided therein, it is possible to manufacture the sensor of the present invention in an easy manner with high accuracy in positioning of the stator coils, which improves the sensor of the present invention in measuring accuracy.

FIGS. 11 and 12 show another type of the positioning means, which will be now described with reference to the drawings.

In this type of positioning means as shown in FIGS. 11 and 12, an annular bobbin 150 is provided with a pair of annular grooves 151 and 152 which axially overlap each other and are wound with stator coils (not shown). In contrast with the other types of the positioning means having been described above, in this type of the positioning means, as shown in FIGS. 11 and 12, there are provided a pair of magnetic-substance plates 153 and 154. The magnetic-substance plate 153 is provided with a cylindrical yoke portion 153a for covering the outer peripheral surfaces of the two stator coils (not shown).

Formed in a lower-end portion of the cylindrical yoke portion 153a of the magnetic-substance plate 153 are four pawl portions 155, two of which are shown in FIG. 11. On the other hand, the remaining magnetic-substance plate 154 is provided with four grooves 156 for receiving the four pawl portions 155 therein in assembly operations.

In the assembly operations, first the annular bobbin 150 is mounted in the cylindrical yoke portion 153a of the magnetic-substance plate 153. Then, the other magnetic-substance plate 154 is mounted on the magnetic-substance plate 153 from the bottom of the plate 153, so that the four pawl portions 155 of the magnetic-substance plate 153 are fitted in the grooves 156 of the other magnetic-substance plate 154, whereby a bobbin assembly 161 as shown in FIG. 12 is completed. This bobbin assembly 161 combines with a core assembly 163 to form a single unit, which is fitted in the casing (not shown), so that the sensor of the present invention is completed through the assembly operations.

In this case, the pawl portions 155 and the grooves 156 are formed into the positioning means.

Incidentally, the core assembly 163 is constructed of a rotating shaft, a rotating core member and the like, details of which are omitted in FIG. 12.

It has been already checked that the sensor of the present invention having the above construction can detect substantially effective variations of the inductance.

In the case shown in FIGS. 11 and 12, since the number of the magnetic-substance plates 153 and 154 is two, it is easy to accomplish the positioning of these plates 153 and 154. Consequently, it is possible to manufacture the sensor of the present invention to be excellent in measuring accuracy in an easy manner, provided that the annular bobbin 150 has already been positioned relative to the magnetic-substance plates 153 and 154.

The positioning of the annular bobbin 150 relative to the magnetic-substance plates 153 and 154 is accomplished as follows.

For example, a pair of semicircular notched portions 171 are formed in an upper surface (as viewed in FIG. 11) of the magnetic-substance plate 153. On the other hand, a pair of slightly-flat upright pieces 172 are formed in an upper surface of the annular bobbin 150, and fitted in the notched portions 171 of the magnetic-substance plate 153.

In addition to the above, four upright pieces (not shown), which are similar in shape to the upright pieces 172, are also formed in a lower surface of the annular bobbin 150, and fitted in four semicircular notched portions 173 of the magnetic-substance plate 154 so as to accomplish the positioning of the annular bobbin 150 relative to the magnetic-substance plates 153 and 154.

As described above, according to the present invention, two stator coils are coaxially arranged with the axis of rotation of the rotor, and the magnetic-substance plates, each of which forms a part of the yoke element of each of the stator coils, assume asymmetric shapes and are arranged to have their radially inwardly protruding portions not axially overlapping each other. Therefore the inductances of two stator coils vary 180° out-of-phase relative to each other. Consequently, assembly operations of the stator coils may be easily accomplished to complete the sensor of the present invention, which is improved in measuring accuracy.

Further, according to the present invention there are provided positioning means between the magnetic-substance plates and the bobbins, between the two bobbins, and between the bobbins and the casing. Consequently, the sensor of the present invention is easily assembled, which permits the positioning operations of the stator coils to be precisely performed. As a result, the present invention may provide a sensor excellent in measuring accuracy in the contactless determination of an angle of rotation of a rotatable structural element.

Incidentally, as for the bobbin wound with two stator coils and sandwiched between the magnetic-substance plates, since the positioning means are provided between the two magnetic-substance plates, it is possible to perform the positioning operations of the magnetic-substance plates relative to each other by simply sandwiching the bobbin between these two magnetic-substance plates without requiring any particular techniques of skilled workers. This enables the sensor of the present invention to be stable in operation and excellent in measuring accuracy.

What is claimed is:

1. A sensor for contactless determination of an angle of rotation of a rotatable structural element, comprising:

a rotor having an axis of rotation and comprising an element made of a magnetic material that is arranged so as to be asymmetrical with respect to said axis of rotation of said rotor;

a first stator coil having an annular shape and disposed so as to be coaxial with said axis of rotation of said rotor;

a second stator coil having an annular shape and disposed so as to be coaxial with said axis of rotation of said rotor;

a pair of first magnetic-circuit forming members having said first stator coil sandwiched therebetween in a direction parallel with said axis of rotation of said rotor, each of said first magnetic-circuit forming members comprising an annular member made of a magnetic material having an inner peripheral portion that is partially flanged so as to form an inner protruding flanged portion that extends annularly through a predetermined angle, said inner protruding flanged portion being spaced away from said rotor with a clearance when said rotor rotates and approaches said inner protruding flanged portion of each of said second magnetic-circuit forming members;

a pair of second magnetic-circuit forming members having said second stator coil sandwiched therebetween in a direction parallel with said axis of rotation of said rotor, each of said second magnetic-circuit forming members comprising an annular member made of a magnetic material having an inner peripheral portion that is partially flanged so as to form an inner protruding flanged portion that extends annularly through a predetermined angle, said inner protruding flanged portion being spaced away from said rotor with a clearance when said rotor rotates and approaches said inner protruding flanged portion of each of said second magnetic-circuit forming members, wherein said inner protruding flanged portions of said second magnetic-circuit forming members do not overlap with said inner protruding flanged portions of first magnetic-circuit forming members in a direction parallel to said axis of rotation of said rotor;

wherein said first and second stator coils have terminals for the application and detection of voltage and said element made of a magnetic material of said rotor causes said first and second stator coils to vary in inductance when said rotor rotates, whereby the variations in inductance can be detected as variations in voltage at said terminals.

2. The sensor of claim 1, wherein:

said inner protruding flanged portions of said first and second magnetic-circuit forming members extend in a direction parallel to said axis of rotation of said rotor;

said inner protruding flanged portions of said first magnetic-circuit forming members are disposed opposite to each other and spaced from each other in a direction parallel to said axis of rotation of said rotor; and said inner protruding flanged portions of said second magnetic-circuit forming members are disposed opposite to each other and spaced from each other in a direction parallel to said axis of rotation of said rotor.

3. The sensor of claim 2, wherein:

said element made of a magnetic material of said rotor has a semicylindrical shape with a center axis that coincides in position with said axis of rotation of said rotor.

4. The sensor of claim 2, wherein:

said element made of a magnetic material of said rotor comprises a pair of parallel semicircular plate members each having a center axis coinciding in position with said axis of rotation of said rotor;

said pair of parallel semicircular plate members are fixedly mounted on said rotor so as to be opposite each other in a direction parallel to said axis of rotation of said rotor;

one of said pair of parallel semicircular plate members has an outer peripheral portion extending over a predetermined angle and spaced with a minute clearance from each of said inner protruding flanged portions of said first magnetic-circuit forming members when said rotor rotates and approaches said inner protruding flanged portions of said first magnetic-circuit forming members; and the other of said pair of parallel semicircular plate members has an outer peripheral portion extending over a predetermined angle and spaced with a minute clearance from each of said inner protruding flanged portions of said second magnetic-circuit forming members when said rotor rotates and approaches said inner protruding flanged portions of said second magnetic-circuit forming members.

5. The sensor of claim 1, wherein said first and second stator coils are separated from each other by a predetermined clearance in a direction parallel to said axis of rotation of said rotor.

6. A sensor for contactless determination of an angle of rotation of a rotatable structural element, comprising:

a rotor having an axis of rotation and comprising an element made of a magnetic material that is arranged so as to be asymmetrical with respect to said axis of rotation of said rotor;

a first stator coil having an annular shape and disposed so as to be coaxial with said axis of rotation of said rotor, said first stator coil having an inner peripheral surface;

a second stator coil having an annular shape and disposed so as to be coaxial with said axis of rotation of said rotor, said second stator coil having an inner peripheral surface;

wherein said first and second stator coils are separated from each other by a predetermined clearance and have a space therebetween in a direction parallel to said axis of rotation of said rotor;

wherein said element made of a magnetic material of said rotor comprises a semicircular plate having a center axis which is coincident in position with said axis of rotation of said rotor, said semicircular plate being disposed in and movable through said space between said first and second stator coils;

a first core member fixedly mounted on said inner peripheral surface of said first stator coil, said first core member being made of a magnetic substance and extending over a predetermined angle on said inner peripheral surface of said first stator coil with respect to said axis of rotation of said rotor;

a second core member fixedly mounted on said inner peripheral surface of said second stator coil, said second core member being made of a magnetic substance and extending over a predetermined angle on said inner peripheral surface of said second stator coil with respect to said axis of rotation of said rotor, said second core member being disposed so as not to overlap with said first core member in a direction parallel to said axis of rotation of said rotor;

a first magnetic shielding plate member made of an electrically conductive material fixedly mounted on an axially inner surface of said first stator coil so as to be disposed opposite to said second core member in a direction parallel to said axis of rotation of said rotor; and a second magnetic shielding plate member made of an electrically conductive material fixedly mounted on an axially inner surface of said second stator coil so as to be disposed opposite to said first core member in a direction parallel to said axis of rotation of said rotor;

wherein said first and second stator coils have terminals for the application and detection of voltage and said element made of a magnetic material of said rotor causes said first and second stator coils to vary in inductance when said rotor rotates, whereby the variations in inductance can be detected as variations in voltage at said terminals.

7. A sensor for contactless determination of an angle of rotation of a rotatable structural element, comprising:

a pair of bobbins wound with stator coils;

a plurality of plates made of magnetic material, at least one pair of said plurality of plates sandwiching said bobbins therebetween;

a rotor having an axis of rotation and comprising an element made of a magnetic material that is arranged so as to be asymmetrical with respect to said axis of rotation of said rotor, said rotor extending axially through said plurality of plates made of magnetic material and said pair of bobbins;

a casing containing said bobbins, said stator coils, said plurality of plates made of a magnetic material and said rotor therein; and positioning means for positioning said plurality of plates made of a magnetic material with respect to said pair of bobbins, said pair of bobbins with respect to each other and said pair of bobbins with respect to said casing.

8. The sensor of claim 7, wherein said positioning means for positioning said plurality of plates made of a magnetic material with respect to said pair of bobbins comprises:

a) axially extending portions extending on inner peripheral portions of axially opposite surfaces of said bobbins, wherein each of said bobbins has an annular shape;

b) axially extending portions extending from inner peripheral portions of axially opposite surfaces of said plurality of plates made of a magnetic material, wherein each of said plurality of plates has an annular shape; and c) said axially extending portions of said bobbins fitting with said inner peripheral portions of said plurality of plates made of a magnetic material and said axially extending portions of said plurality of plates made of a magnetic material fitting with said inner peripheral portions of said bobbins.

9. The sensor of claim 7, wherein said positioning means for positioning said pair of bobbins with respect to each other comprises a pair of adjacent ones of said plurality of plates made of a magnetic material being integrated with each other as one piece.

10. The sensor of claim 7, wherein said positioning means for positioning said pair of bobbins with respect to said casing comprises:

a) a projection on an outer peripheral surface of each of said bobbins; and b) a notch on said casing into which fit said projection of each of said bobbins.

11. A sensor for contactless determination of an angle of rotation of a rotatable structural element, comprising:

a bobbin wound with stator coils thereon;

a pair of plates made of magnetic material sandwiching said bobbin therebetween;

a rotor having an axis of rotation and comprising an element made of a magnetic material that is arranged so as to be asymmetrical with respect to said axis of rotation of said rotor, said rotor extending axially through said plurality of plates made of magnetic material and said bobbin;

a casing containing said bobbin, said stator coils, said plurality of plates made of a magnetic material and said rotor therein; and positioning means for positioning said plurality of plates made of magnetic material relative to each other and for positioning said bobbin relative to said plurality of plates, said positioning means comprising protrusions and spaces for receiving said protrusions provided on said plurality of plates and said bobbin.

12. A sensor for contactless determination of an angle of rotation of a rotatable structural element, comprising:

a rotor having an axis of rotation and comprising an element made of a magnetic material that is arranged so as to be asymmetrical with respect to said axis of rotation of said rotor;

a first stator coil having an annular shape and disposed so as to be coaxial with said axis of rotation of said rotor;

a second stator coil having an annular shape and disposed so as to be coaxial with said axis of rotation of said rotor;

a pair of first magnetic-circuit forming members having said first stator coil sandwiched therebetween in a direction parallel with said axis of rotation of said rotor, each of said first magnetic-circuit forming members comprising an annular member made of a magnetic material having an inner peripheral portion that is partially flanged so as to form an inner protruding flanged portion that extends annularly through an angle of 180 degrees with respect to said axis of rotation of said rotor, said inner protruding flanged portion being spaced away from said rotor with a clearance when said rotor rotates and approaches said inner protruding flanged portion of each of said second magnetic-circuit forming members;

a pair of second magnetic-circuit forming members having said second stator coil sandwiched therebetween in a direction parallel with said axis of rotation of said rotor, each of said second magnetic-circuit forming members comprising an annular member made of a magnetic material having an inner peripheral portion that is partially flanged so as to form an inner protruding flanged portion that extends annularly through an angle of 180 degrees with respect to said axis of rotation of said rotor, said inner protruding flanged portion being spaced away from said rotor with a clearance when said rotor rotates and approaches said inner protruding flanged portion of each of said second magnetic-circuit forming members, wherein said inner protruding flanged portions of said second magnetic-circuit forming members do not overlap with and are 180 degrees out of phase with said inner protruding flanged portions of first magnetic-circuit forming members in a direction parallel to said axis of rotation of said rotor;

wherein said first and second stator coils have terminals for the application and detection of voltage and said element made of a magnetic material of said rotor causes said first and second stator coils to vary in inductance when said rotor rotates, whereby the variations in inductance can be detected as variations in voltage at said terminals;

wherein said inner protruding flanged portions of said first and second magnetic-circuit forming members extend in a direction parallel to said axis of rotation of said rotor;

wherein said inner protruding flanged portions of said first magnetic-circuit forming members are disposed opposite to each other and spaced from each other in a direction parallel to said axis of rotation of said rotor;

wherein said inner protruding flanged portions of said second magnetic-circuit forming members are disposed opposite to each other and spaced from each other in a direction parallel to said axis of rotation of said rotor; and wherein said element made of a magnetic material of said rotor has a semicylindrical shape with a center axis that coincides in position with said axis of rotation of said rotor.

13. A sensor for contactless determination of an angle of rotation of a rotatable structural element, comprising:

a rotor having an axis of rotation and comprising an element made of a magnetic material that is arranged so as to be asymmetrical with respect to said axis of rotation of said rotor;

a first stator coil having an annular shape and disposed so as to be coaxial with said axis of rotation of said rotor;

a second stator coil having an annular shape and disposed so as to be coaxial with said axis of rotation of said rotor;

a pair of first magnetic-circuit forming members having said first stator coil sandwiched therebetween in a direction parallel with said axis of rotation of said rotor, each of said first magnetic-circuit forming members comprising an annular member made of a magnetic material having an inner peripheral portion that is partially flanged so as to form an inner protruding flanged portion that extends annularly through an angle of 180 degrees with respect to said axis of rotation of said rotor, said inner protruding flanged portion being spaced away from said rotor with a clearance when said rotor rotates and approaches said inner protruding flanged portion of each of said second magnetic-circuit forming members;

a pair of second magnetic-circuit forming members having said second stator coil sandwiched therebetween in a direction parallel with said axis of rotation of said rotor, each of said second magnetic-circuit forming members comprising an annular member made of a magnetic material having an inner peripheral portion that is partially flanged so as to form an inner protruding flanged portion that extends annularly through an angle of 180 degrees with respect to said axis of rotation of said rotor, said inner protruding flanged portion being spaced away from said rotor with a clearance when said rotor rotates and approaches said inner protruding flanged portion of each of said second magnetic-circuit forming members, wherein said inner protruding flanged portions of said second magnetic-circuit forming members do not overlap with and are 180 degrees out of phase with said inner protruding flanged portions of said first magnetic-circuit forming members in a direction parallel to said axis of rotation of said rotor;

wherein said first and second stator coils have terminals for the application and detection of voltage and said element made of a magnetic material of said rotor causes said first and second stator coils to vary in inductance when said rotor rotates, whereby the variations in inductance can be detected as variations in voltage at said terminals;

wherein said element made of a magnetic material of said rotor comprises a pair of parallel semicylindrical plate members each having a center axis coinciding in position with said axis of rotation of said rotor;

wherein said pair of parallel semicircular plate members are fixedly mounted on said rotor so as to be opposite each other in a direction parallel to said axis of rotation of said rotor;

wherein one of said pair of parallel semicircular plate members has an outer peripheral portion extending over a predetermined angle and spaced with a minute clearance from each of said inner protruding flanged portions of said first magnetic-circuit forming members when said rotor rotates and approaches said inner protruding flanged portions of said first magnetic-circuit forming members; and wherein the other of said pair of parallel semicircular plate members has an outer peripheral portion extending over a predetermined angle and spaced with a minute clearance from each of said inner protruding flanged portions of said second magnetic-circuit forming members when said rotor rotates and approaches said inner protruding flanged portions of said second magnetic-circuit forming members.

14. A sensor for contactless determination of an angle of rotation of a rotatable structural element, comprising:

a rotor having an axis of rotation and comprising an element made of a magnetic material that is arranged so as to be asymmetrical with respect to said axis of rotation of said rotor;

a first stator coil having an annular shape and disposed so as to be coaxial with said axis of rotation of said rotor, said first stator coil having an inner peripheral surface;

a second stator coil having an annular shape and disposed so as to be coaxial with said axis of rotation of said rotor, said second stator coil having an inner peripheral surface;

wherein said first and second stator coils are separated from each other by a predetermined clearance and have a space therebetween in a direction parallel to said axis of rotation of said rotor;

wherein said element made of a magnetic material of said rotor comprises a semicircular plate having a center axis which is coincident in position with said axis of rotation of said rotor, said semicircular plate being disposed in and movable through said space between said first and second stator coils;

a first core member fixedly mounted on said inner peripheral surface of said first stator coil, said first core member being made of a magnetic substance, having a semicylindrical shape and extending over a predetermined angle on said inner peripheral surface of said first stator coil with respect to said axis of rotation of said rotor;

a second core member fixedly mounted on said inner peripheral surface of said second stator coil, said second core member being made of a magnetic substance, having a semicylindrical shape and extending over a predetermined angle on said inner peripheral surface of said second stator coil with respect to said axis of rotation of said rotor, said second core member being disposed so as not to overlap with said first core member in a direction parallel to said axis of rotation of said rotor and so as to be 180 degrees out of phase with said first core member;

a first magnetic shielding plate member made of an electrically conductive material fixedly mounted on an axially inner surface of said first stator coil so as to be disposed opposite to said second core member in a direction parallel to said axis of rotation of said rotor, said first magnetic shielding plate member having a semicircular shape; and a second magnetic shielding plate member made of an electrically conductive material fixedly mounted on an axially inner surface of said second stator coil so as to be disposed opposite to said first core member in a direction parallel to said axis of rotation of said rotor, said second magnetic shielding plate member having a semicircular shape;

wherein said first and second stator coils have terminals for the application and detection of voltage and said element made of a magnetic material of said rotor causes said first and second stator coils to vary in inductance when said rotor rotates, whereby the variations in inductance can be detected as variations in voltage at said terminals.

15. A sensor for contactless determination of an angle of rotation of a rotatable structural element, comprising:

a pair of bobbins wound with stator coils;

a plurality of plates made of magnetic material, at least one pair of said plurality of plates sandwiching said bobbins therebetween;

a rotor having an axis of rotation and comprising an element made of a magnetic material that is arranged so as to be asymmetrical with respect to said axis of rotation of said rotor, said rotor extending axially through said plurality of plates made of magnetic material and said pair of bobbins;

a casing containing said bobbins, said stator coils, said plurality of plates made of a magnetic material and said rotor therein; and positioning means for positioning said plurality of plates made of a magnetic material with respect to said pair of bobbins, said pair of bobbins with respect to each other and said pair of bobbins with respect to said casing;

wherein said positioning means for positioning said plurality of plates made of a magnetic material with respect to said pair of bobbins comprises a) axially extending portions extending on inner peripheral portions of axially opposite surfaces of said bobbins, wherein each of said bobbins has an annular shape, b) axially extending portions extending from inner peripheral portions of axially opposite surfaces of said plurality of plates made of a magnetic material, wherein each of said plurality of plates has an annular shape, and c) said axially extending portions of said bobbins fitting with said inner peripheral portions of said plurality of plates made of a magnetic material and said axially extending portions of said plurality of plates made of a magnetic material fitting with said inner peripheral portions of said bobbins;

wherein said positioning means for positioning said pair of bobbins with respect to each other comprises a pair of adjacent ones of said plurality of plates made of a magnetic material being integrated with each other as one piece; and wherein said positioning means for positioning said pair of bobbins with respect to said casing comprises
 a) a projection on an outer peripheral surface of each of said bobbins, and
 b) a notch on said casing into which fit said projection of each of said bobbins.

16. A sensor for contactless determination of an angle of rotation of a rotatable structural element, comprising:

a bobbin wound with stator coils;

a pair of plates made of magnetic material plates sandwiching said bobbin therebetween, said pair of plates comprising a first plate having a cylindrical shape and a lower end and a second plate;

a rotor having an axis of rotation and comprising an element made of a magnetic material that is arranged so as to be asymmetrical with respect to said axis of rotation of said rotor, said rotor extending axially through said plurality of plates made of magnetic material and said pair of bobbins;

a casing containing said bobbins, said stator coils, said plurality of plates made of a magnetic material and said rotor therein; and positioning means provided between said pair of plates made of magnetic material for positioning said pair of plates made of magnetic material relative to each other, said positioning means comprising pawl portions on said lower end of said first plate and grooves in said second plate for receiving said pawl portions.

* * * * *

UNITED STATES PATENT AND TRADEMARK OFFICE
CERTIFICATE OF CORRECTION

PATENT NO. : 5,521,495
DATED : May 28, 1996
INVENTOR(S) : Hajime TAKAHASHI et al.

It is certified that error appears in the above-indentified patent and that said Letters Patent is hereby corrected as shown below:

Column 12, line 52, change "said second" to --said first--;

Column 16, line 9, change "said second magnetic-circuit" to --said first magnetic-circuit--;

Column 17, line 11, change "said second magnetic-circuit" to --said first magnetic-circuit--.

Signed and Sealed this

Seventeenth Day of September, 1996

Attest:

BRUCE LEHMAN

*Attesting Officer*     *Commissioner of Patents and Trademarks*